Patented Jan. 30, 1951

2,539,854

UNITED STATES PATENT OFFICE

2,539,854

ALKALOID SALTS OF N-FORMYL-S-BENZYL d - PENICILLAMINE AND PREPARATION THEREOF

Ralph Mozingo, Elizabeth, James F. McPherson, Rahway, and Karl Folkers, Plainfield, N. J., assignors to Merck & Co., Inc., Rahway, N. J., a corporation of New Jersey No Drawing. Application July 19, 1946, Serial No. 684,790

6 Claims. (Cl. 260—284)

This invention relates to methods of preparing compounds useful in the synthesis of penicillin. More particularly it is concerned with the separation of a racemic mixture of N-formyl-S-benzyl-$\beta,\beta$-dimethylcysteine and to the recovery of d-$\beta,\beta$-dimethylcysteine.

It has been discovered in accordance with the invention disclosed in an application to one of the applicants, Harris and Folkers, Serial No. 656,772, filed March 23, 1946, now U. S. Patent No. 2,480,866, that compounds having penicillin activity can be prepared synthetically by condensing d-$\beta,\beta$-dimethylcysteine with a 4-alkoxymethylene-5(4)-oxazolone having a suitable monovalent organic radical in the 2-position.

It is the dextrorotatory form of $\beta,\beta$-dimethylcysteine however that produces compounds possessing antibiotic activity. In this process the laevorotatory isomer does not produce compounds having antibiotic activity, and its presence together with d-$\beta,\beta$-dimethylcysteine in a racemic preparation appears to interfere with the full utilization of the dextrorotatory isomer. It is therefore desirable that the isomers be separated.

In accordance with the present invention recovery of the desired dextrorotatory isomer is accomplished by separating a racemic derivative of $\beta,\beta$-dimethylcysteine, namely dl-N-formyl-S-benzyl-$\beta,\beta$-dimethylcysteine. It has been found that the starting material, dl-N-formyl-S-benzyl-$\beta,\beta$-dimethylcysteine, can be prepared by reacting 2-phenyl-4-isopropylidene-5(4)-oxazolone with benzyl mercaptan, hydrolyzing the dl-N-benzoyl - S - benzyl - $\beta,\beta$ - dimethylcysteine thus formed and reacting the hydrolysis product, dl-S-benzyl-$\beta,\beta$-dimethylcysteine, with formic acid. This process is fully disclosed in the University of Oxford Report No. Pen–100.

Regarded in certain of its broader aspects the process according to the present invention involves reacting a racemate of N-formyl-S-benzyl-$\beta,\beta$-dimethylcysteine with an alkaloid in the presence of an organic solvent to precipitate the alkaloidal salt of d-N-formyl-S-benzyl-$\beta,\beta$-dimethylcysteine, reacting the latter compound with an alkali, extracting the alkaloid with an organic solvent, hydrolyzing the d-N-formyl-S-benzyl-$\beta,\beta$-dimethylcysteine thus formed and recovering d(—)-S-benzyl-$\beta,\beta$-dimethylcysteine.

The d(—)-S-benzyl-$\beta,\beta$-dimethylcysteine thus obtained can be readily converted to d-$\beta,\beta$-dimethylcysteine by treatment with sodium in liquid ammonia.

In accordance with a preferred embodiment of our invention a mixture of dl-N-formyl-S-benzyl-$\beta,\beta$-dimethylcysteine, an alkaloid and an organic solvent are heated until all of the solids are dissolved. The reaction mixture is then allowed to cool to room temperature and placed in a refrigerator for about 16 hours. The alkaloidal salt of d-N-formyl-S-benzyl-$\beta,\beta$-dimethylcysteine crystallizes from solution and is removed. The crystals thus obtained are dissolved in an alkali solution such as ammonium hydroxide and an organic solvent, such as ethylene chloride is added. The alkaloid is thereby extracted into the organic layer and removed. The ammoniacal solution of d-N-formyl-S-benzyl-$\beta,\beta$-dimethylcysteine is then hydrolyzed with hydrochloric acid and d(—) - S - benzyl-$\beta,\beta$-dimethylcysteine recovered.

The alkaloids which have proved suitable for our reaction include quinine and quinidine. It should be noted that lower aliphatic alcohols such as methyl, ethyl, propyl and isopropyl alcohols may be employed in this reaction.

While the present invention is not restricted to any particular racemic mixture of N-formyl-S-benzyl-$\beta,\beta$-dimethylcysteine, we have found that mixtures containing less of the laevorotatory compound are most satisfactorily treated. The undesirable laevorotatory isomer can be removed by treating a mixture of dl-N-formyl-S-benzyl-$\beta,\beta$-dimethylcysteine with cinchonidine, brucine or ephedrine in the presence of an organic solvent. The corresponding salt of l-N-formyl-S-benzyl-$\beta,\beta$-dimethylcysteine is precipitated and removed. The filtrate, which is predominantly d-N - formyl-S-benzyl-$\beta,\beta$-dimethylcysteine can then be treated in accordance with our invention.

The following examples set forth a method of carrying out the invention.

Example 1

A mixture of 213.6 g. (0.8 mole) of dl-N-formyl-S-benzyl-$\beta,\beta$-dimethylcysteine (prepared in accordance with the method disclosed in the University of Oxford Report Pen-100), and 259.2 g. (0.8 mole) of anhydrous quinidine was dissolved in 1 liter of hot ethanol. The solution was cooled to room temperature and crystallization allowed to proceed for sixteen hours at room temperature. The quinidine salt was collected and sucked as dry as possible. The salt was then dissolved in about 700 ml. of hot ethanol and the solution cooled to room temperature. After standing three hours, the crystallized quinidine salt of d-N-formyl-S-benzyl-$\beta,\beta$-dimethylcysteine was collected and air-dried for sixteen hours. This crude product had a melting point of 95–100° C. and an optical rotation $(\alpha)_D^{25}$ +125.4° (c, 1, 50% ethanol).

About 167 g. of the quinidine salt of d-N-formyl-S-benzyl-$\beta,\beta$-dimethylcysteine was well shaken with 450 ml. of 1 N ammonium hydroxide and 900 ml. of ethylene chloride. The ethylene chloride layer was separated and washed with 50 ml. of 1 N ammonium hydroxide. The combined ammonium hydroxide solutions were washed with two 100-ml. portions of ethylene chloride. The ethylene chloride solutions were saved for quinidine recovery. The ammoniacal solution was filtered to remove any insoluble material and concentrated on the water pump to a volume of about 550 ml. The solution obtained was very faintly acidic and was made 1 N to hydrochloric acid by adding 50 ml. of concentrated hydrochloric acid. It was refluxed for one and one-quarter hours. The hydrolysis mixture was cooled and neutralized with concentrated ammonium hydroxide. 42.6 g. of d(−)-S-benzyl-$\beta,\beta$-dimethylcysteine melting at 188–189° C. with decomposition and having an optical rotation of $(\alpha)_D^{25}$ −89.5° (c, 1, 1 N sodium hydroxide) was collected. The filtrate of 500 ml. volume was concentrated to 100 ml. and a second crop of crystals was collected. These crystals weighed 4.2 g. and melted at 189–190° C. with decomposition and had an optical rotation of $(\alpha)_D^{25}$ −84.4°. Further concentration yielded ammonium chloride.

Example 2

A mixture of about 5.34 g. of dl-N-formyl-S-benzyl-$\beta,\beta$-dimethylcysteine, 7.56 g. of quinine and 60 ml. of absolute ethyl alcohol was heated until solution was complete and then filtered. The filtrate was allowed to come to room temperature and placed in an ice box overnight, whereupon crystallization of the quinine salt of d-N-formyl-S-benzyl-$\beta,\beta$-dimethylcysteine occurred. Two crops of crystals were collected. The first crop of crystals, 3.7 g., melted at 177–178° C., the second crop, 1.1 g., melted at 179–180° C. After recrystallization from ethyl alcohol the optical rotation of the quinine salt of d-N-formyl-S-benzyl-$\beta,\beta$-dimethylcysteine was $(\alpha)_D^{25}$ −132° (c, 1, 50% ethanol) and the melting point was 180–181° C.

Example 3

To a solution of 210 g. of dl-N-formyl-S-benzyl-$\beta,\beta$-dimethylcysteine dissolved in 1600 ml. of butanol was added 310 gms. of brucine. The mixture was heated until solution was complete and then allowed to stand overnight at 25° C. Crystals of the brucine salt of l-N-formyl-S-benzyl-$\beta,\beta$-dimethylcysteine formed and were removed. Two recrystallizations from ethanol yielded a laevorotatory salt melting at 94–95° C. After further recrystallization from 800 ml. of butanol and 40 ml. of water, the crystals (A) melted at 105–108° C. and decomposed at 110° C. The original mother liquors (except for the second butanol-water mixture) were concentrated to 900 ml. and cooled to give crystals (B) which were recrystallized from the mother liquors from the final recrystallization of (A). The resulting crystals melted at 100–105° C.

The combined filtrates were evaporated to an oil and 500 ml. of chloroform and 1 liter of N ammonium hydroxide were added. The aqueous layer was separated, washed and two 200 ml. portions of chloroform and filtered through a wet paper. The brucine was thus removed with the chloroform and the ammonia was removed by concentration of the filtrate to 750 ml. The solution was cooled and made acid to Congo red with concentrated hydrochloric acid. The product was collected and washed with a small amount of ice water.

140 g. of the moist product which is predominantly d-N-formyl-S-benzyl-$\beta,\beta$-dimethylcysteine and 154 g. of hydrated quinidine were dissolved in 700 ml. of absolute alcohol. The resulting crystals of the quinidine salt of d-N-formyl-S-benzyl-$\beta,\beta$-dimethylcysteine were collected and dissolved in 700 ml. of hot absolute alcohol. The solution deposited crystals weighing 129 g. which had a melting point of 105–110° C. and an optical rotation $(\alpha)_D^{25}$ +121° (c, 1, 50% alcohol). A second crop of crystals from the mother liquors was quinidine. Recrystallization of the salt from absolute alcohol gave material weighing 95 g. and having a melting point of 108–111° C. and an optical rotation of $(\alpha)_D^{25}$ +119.5° (c, 1, 50% alcohol).

62 g. of the quinidine salt of d-N-formyl-S-benzyl-$\beta,\beta$-dimethylcysteine was decomposed to give the free acid. The salt was dissolved in 200 ml. of chloroform and 250 ml. of 1 N ammonium hydroxide added. After shaking the two together well, the layers were separated and the aqueous layer washed twice with 50 ml. portions of chloroform. The aqueous layer was filtered through a wet paper and concentrated to 200 ml. and again diluted to 250 ml. with water. After adding 20 ml. of concentrated hydrochloric acid, the mixture was refluxed one and one-quarter hours. The solution was cooled and neutralized with ammonium hydroxide. The first crop of crystals of d(−)-S-benzyl-$\beta,\beta$-dimethylcysteine weighed 15.1 g., melted at 193–194° C. with decomposition and had an optical rotation of $(\alpha)_D^{25}$ −86.8° (c, 1, 5% sodium hydroxide). A second crop of crystals weighing 0.77 g. was obtained by concentrating the mother liquors. This crop had a melting point of 192–193° C., and had an optical rotation of $(\alpha)_D^{25}$ −86° (c, 1, 5% sodium hydroxide).

Example 4

A mixture of 5.34 g. of dl-N-formyl-S-benzyl-$\beta,\beta$-dimethylcysteine, 5.88 g. of cinchonidine and 50 ml. of absolute ethyl alcohol was warmed on a steam bath until solution was complete and then filtered. The filtrate was allowed to come to room temperature and placed in an ice box overnight whereupon crystallization of the cinchonidine salt of l-N-formyl-S-benzyl-$\beta,\beta$-dimethylcysteine occurred. These crude crystals were collected and after being washed with a small amount of absolute ethyl alcohol, had a melting point of 180–183° C. The laevorotatory salt was dissolved in 100 ml. of hot absolute ethyl alcohol and allowed to recrystallize at room temperature. The recrystallized product had a melting point of 186–187° C. and an optical rotation $(\alpha)_D^{25}$ −80° (c, 1, 50% ethanol).

Various changes and modifications may be made in our process, certain preferred embodiments of which are described herein, which changes and modifications would, nevertheless, be within the scope of our invention. It is our intention that such changes and modifications, to the extent that they are within the scope of the appended claims, shall be considered as part of our invention.

We claim:

1. The quinine salt of d-N-formyl-S-benzyl-β,β-dimethylcysteine.

2. The quinidine salt of d-N-formyl-S-benzyl-β,β-dimethylcysteine.

3. The process that comprises reacting a racemic mixture of N-formyl-S-benzyl-β,β-dimethylcysteine with an alkaloid selected from the class consisting of quinine and quinidine in the presence of a lower aliphatic alcohol whereby the corresponding alkaloidal salt of d-N-formyl-S-benzyl-β,β-dimethylcysteine precipitates in said reaction mixture and is recovered.

4. The process that comprises reacting a racemic mixture of N-formyl-S-benzyl-β,β-dimethylcysteine with quinine in the presence of a lower aliphatic alcohol whereby the quinine salt of d-N-formyl-S-benzyl-β,β-dimethylcysteine precipitates in said reaction mixture and is recovered.

5. The process that comprises reacting a racemic mixture of N-formyl-S-benzyl-β,β-dimethylcysteine with quinidine in the presence of a lower aliphatic alcohol whereby the quinidine salt of d-N-formyl-S-benzyl-β,β-dimethylcysteine precipitates in said reaction mixture and is recovered.

6. A compound selected from the group which consists of the quinine salt of d-N-formyl-S-benzyl-β,β-dimethylcysteine and the quinidine salt of d-N-formyl-S-benzyl-β,β-dimethylcysteine.

RALPH MOZINGO.
JAMES F. McPHERSON.
KARL FOLKERS.

REFERENCES CITED

The following references are of record in the file of this patent:

UNITED STATES PATENTS

| Number | Name | Date |
| --- | --- | --- |
| 1,867,274 | Manske | July 12, 1932 |
| 2,430,455 | Crooks | Nov. 11, 1947 |

OTHER REFERENCES

Du Vigneaud et al.: "J. Biolchem.," vol. 109 (1935), pp. 97–103.

Karrer: "Organic Chemistry" (1938), pp. 87 to 96. Distributed by Nordeman Publishing Co., Inc., N. Y. C.

Wood et al.: "J. Biolchem.," vol. 130 (1939), pp. 109–114.